(12) United States Patent
Murti et al.

(10) Patent No.: US 12,189,488 B2
(45) Date of Patent: *Jan. 7, 2025

(54) HYPER-SCALE P2P DEDUPLICATED STORAGE SYSTEM USING A DISTRIBUTED LEDGER

(71) Applicant: EMC IP Holding Company LLC, Hopkinton, MA (US)

(72) Inventors: Arun Murti, Mission Viejo, CA (US); Joey C. Lei, Irvine, CA (US); Adam E. Brenner, Mission Viejo, CA (US); Mark D. Malamut, Aliso Viejo, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,801

(22) Filed: Jul. 31, 2023

(65) Prior Publication Data
US 2023/0376384 A1 Nov. 23, 2023

Related U.S. Application Data

(63) Continuation of application No. 16/516,109, filed on Jul. 18, 2019, now Pat. No. 11,789,824.

(51) Int. Cl.
*G06F 11/14* (2006.01)
*H04L 9/00* (2022.01)
(Continued)

(52) U.S. Cl.
CPC ...... *G06F 11/1453* (2013.01); *G06F 11/1464* (2013.01); *H04L 9/3213* (2013.01);
(Continued)

(58) Field of Classification Search
CPC ............ G06F 11/1453; G06F 11/1464; H04L 9/3213; H04L 9/3236; H04L 9/3271; H04L 67/1097; H04L 9/50
(Continued)

(56) References Cited

U.S. PATENT DOCUMENTS

2015/0074222 A1 3/2015 Liang et al.
2018/0159682 A1* 6/2018 Futcher ............... H04L 63/0428
(Continued)

FOREIGN PATENT DOCUMENTS

EP 2557514 A1 2/2013

OTHER PUBLICATIONS

Chen et al., A Secure Privacy-Preserving Cloud Auditing Scheme with Data Deduplication, International Journal of Network Security, Mar. 31, 2019, pp. 199-210.
(Continued)

*Primary Examiner* — Hosain T Alam
*Assistant Examiner* — Nicholas E Allen
(74) *Attorney, Agent, or Firm* — Workman Nydegger

(57) ABSTRACT

One example method includes receiving from a node, in an HSAN that includes multiple nodes, an ADD_DATA request to add an entry to a distributed ledger of the HSAN, the request comprising a user ID that identifies the node, a hash of a data segment, and a storage location of the data segment at the node, performing a challenge-and-response process with the node to verify that the node has a copy of the data that was the subject of the entry, making a determination that a replication factor X has not been met, and adding the entry to the distributed ledger upon successful conclusion of the challenge-and-response process.

20 Claims, 4 Drawing Sheets

(51) Int. Cl.
  *H04L 9/32* (2006.01)
  *H04L 67/1097* (2022.01)
(52) U.S. Cl.
  CPC .......... *H04L 9/3236* (2013.01); *H04L 9/3271* (2013.01); *H04L 67/1097* (2013.01); *H04L 9/50* (2022.05)
(58) Field of Classification Search
  USPC ........................................................ 707/692
  See application file for complete search history.

(56) References Cited

U.S. PATENT DOCUMENTS

| | | | |
|---|---|---|---|
| 2018/0260125 A1 | 9/2018 | Botes et al. | |
| 2018/0329693 A1* | 11/2018 | Eksten | G06F 8/65 |
| 2019/0034465 A1* | 1/2019 | Shimamura | G06Q 20/02 |
| 2019/0050367 A1* | 2/2019 | Saur | H04L 9/0637 |
| 2019/0081783 A1* | 3/2019 | Bohli | G06F 3/064 |
| 2019/0158594 A1* | 5/2019 | Shadmon | H04L 67/01 |
| 2019/0171365 A1 | 6/2019 | Power et al. | |
| 2023/0376384 A1* | 11/2023 | Murti | G06F 16/1834 |

OTHER PUBLICATIONS

International Search Report and Written Opinion issued in Application No. PCT/US2020/024149 dated Jul. 6, 2020.
Jingyi et al., Deduplication with Blockchain for Secure Cloud Storage, Communications In Computer And Information Science, vol. 45, Oct. 11, 2018, pp. 558-570.
Mohamed El Ghazouani et al: "Blockchain & Multi-Agent System: A Promising Approach for Cloud Data Integrity Auditing with Deduplication," International Journal Of Communication Networks and Information Security, Apr. 1, 2019, pp. 175-184 URL: https://www.ijcnis.org/index.php/ijcnis/article/download/3880/341.

* cited by examiner

HYPER-SCALE P2P DEDUPLICATED STORAGE SYSTEM USING A DISTRIBUTED LEDGER

FIELD OF THE INVENTION

Embodiments of the present invention generally relate to data protection and data deduplication. More particularly, at least some embodiments of the invention relate to systems, hardware, software, computer-readable media, and methods for facilitating large scale data deduplication across separate user data repositories, while maintaining the integrity of the user data.

BACKGROUND

Current data de-duplication storage, or dedupe storage, is typically implemented with "corporate locality," meaning that the data that can be deduplicated is limited to the data that is located within the data lake, such as data centers and clouds for example, of a particular organization. As well, there are often a significant number of data segments that are common to multiple different enterprises, such as operating system files, Windows for example, and application software files such as SQL Server for example. In such cases, a single copy of the data segment, file, or other dataset, could satisfy the need for multiple enterprises. Thus, limiting deduplication efforts to the confines of a specific enterprise is not an optimal approach.

In recognition of such limitations, cloud service providers who offer backup-as-a-service to their customers may "pool" de-duplication storage targets to create larger de-duplication domains. This approach presents significant problems however. For example, the cost benefits of de-duplicating common data across multiple disparate customers are realized in the first instance by the service provider, but the service provider may not pass those savings to the customers themselves. As another example, customers of backup service providers must, in order to avail themselves of the opportunity for pooled deduplication, cede the governance of stored data to a central entity, who thus becomes an attractive target for data breaches. If a malicious actor gains access to the systems of the service provider, backup data may be compromised, and the trust of the customers lost.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
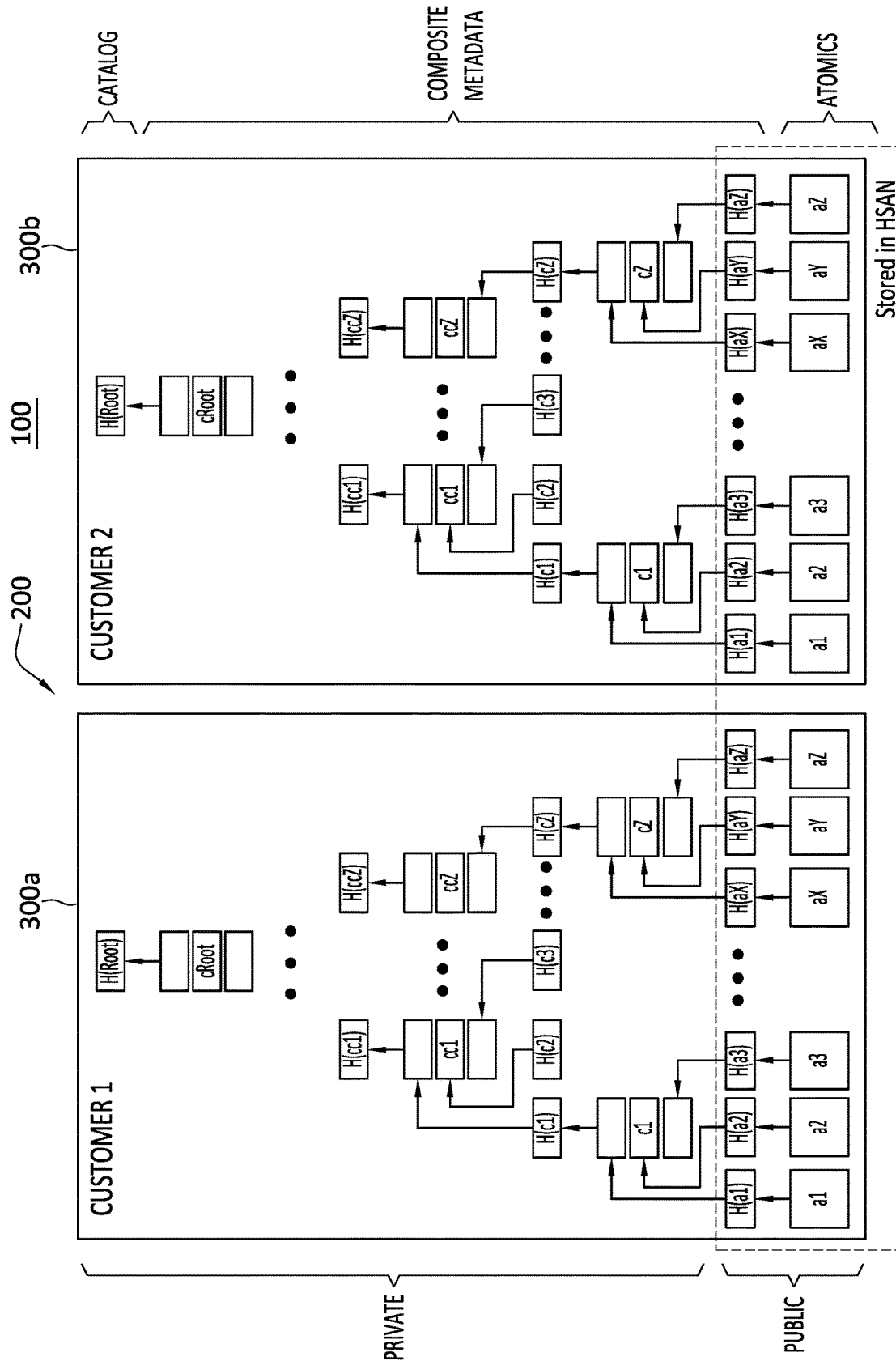
FIG. 1 discloses aspects of an example HSAN.

Embodiments of the present invention generally relate to data protection and data deduplication. More particularly, at least some embodiments of the invention relate to systems, hardware, software, computer-readable media, and methods for facilitating large scale data deduplication across separate user data repositories, while maintaining the integrity of the user data.

In general, example embodiments of the invention embrace a hyper-scale, peer-to-peer, de-duplicated storage system (HSAN), which can be shared securely across multiple organizations. The HSAN configuration allows users to de-duplicate across their respective data lakes, lowering the overall cost to service data protection SLAs, at a global scale. The HSAN operates in connection with an immutable distributed ledger, that can be implemented using blockchain technology, which acts as a public record of references to data segments that are stored within the various private data lakes. These references contain the content fingerprint and storage locations of the data segments, but not the metadata about the files and directories to which the segments belong, or the actual content of the segments. In this way, the storage system provides secure storage for each of the different users, notwithstanding that it is a public storage system.

Advantageously then, embodiments of the invention may provide various benefits and improvements relative to conventional hardware, systems and methods. To illustrate, an embodiment of the invention may eliminate the requirement for a customer to have to trust an external third-party with their actual data. Instead, embodiments of the invention enable the customer to realize similar benefits by sharing only limited information, such as fingerprints, about their data. As another example, embodiments of the invention may be advantageous inasmuch as they provide a public record of transactions that can be used to verify integrity across the respective data repositories of multiple different users to ensure mutual trust. As a final example, embodiments of the invention separate the public and private elements of the data of a user so that the benefits of deduplication can be realized, while the integrity of the respective private data of the users is maintained.

It should be noted that the foregoing advantageous aspects of various embodiments are presented only by way of example, and various other advantageous aspects of example embodiments of the invention will be apparent from this disclosure. It is further noted that it is not necessary that any embodiment implement or enable any of such advantageous aspects disclosed herein.

A. Aspects of Example Operating Environments and Architecture

The following is a discussion of aspects of example operating environments for various embodiments of the invention. This discussion is not intended to limit the scope of the invention, or the applicability of the embodiments, in any way. In addition to the following discussion, further details concerning example operating environments in which embodiments of the invention may be implemented are disclosed in the Related Applications.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, data deduplication operations, and disaster recovery operations. Thus, while the discussion herein may, in some aspects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with, and/or incorporated into, data backup and restore platforms, systems and devices, examples of which include, but are not limited to, the Dell-EMC NetWorker and Avamar platforms, Dell-EMC Enterprise Copy Data Management (ECDM), Dell-EMC Integrated Data Protection Appliance (IDPA), Dell-EMC PowerProtect, and/or data protection environments such as Dell-EMC Data Domain.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular attention now to FIG. 1, an example operating environment 100 may comprise, or consist of, an HSAN 200 that is a peer-to-peer data protection storage system implemented as a set of peer-to-peer nodes, such as nodes 300a and 300b, which implement a distributed, de-duplicated storage system. Thus, the HSAN contrasts with a centralized system such as that of a service provider where a group of remote data silos replicate data to a central silo, and the HSAN also contrasts with a de-centralized system of a private enterprise, where replication of data occurs between centralized data silos.

The HSAN nodes 300a and 300b can be owned and controlled by a single entity such as a company, or the nodes can each be owned and controlled by different respective entities. The data in the HSAN 200 is split into two types, namely, atomic data, and metadata. In general, the atomic data may be public, while the metadata is kept private. While, in the interest of simplicity, FIG. 1 discloses only two nodes, it should be understood that embodiments of the invention can be employed in connection with any number of nodes, although for practical purposes it may sometimes be useful to limit the number of nodes that are permitted to participate in the HSAN.

B. Atomic Data and Metadata

With continued reference to FIG. 1, and the atomic data in particular, it can be seen that backup data has been split into chunks, that is, atomic data a1, a2, a3, aX, aY, and aZ, for example. One, some, or all of the chunks, or atomic data, may be common to the nodes 300a and 300b, and other nodes as well. A cryptographic hash function, such as SHA-2 for example, is used to generate a fingerprint, or hash, of the content of the chunk. The hash uniquely identifies the content of the chunk, but does not identify the source of the data itself such as the creator, nor reference any metadata, such as the file name for example, associated with the chunk. Thus, the hash of atomic data a1 is H(a1), the hash of atomic data a2 is H(a2), and so forth, as shown in FIG. 1. In the illustrated example, the atomic data a1 . . . aZ, together with the hashes H(a1) . . . H(aZ), constitutes the public data. In some embodiments, the chunks have a fixed size, such as 64 KB for example, and are stored a fixed number of times across nodes 300a and 300b. In other embodiments, chunks may be variable-sized, and/or have varying numbers of copies. In general, the atomic data is stored on the private data protection storage system of a company, examples of which include the Dell-EMC Avamar and Data Domain platforms.

As shown, the hashing process can continue upward any number of levels. Thus, for example, H(a1), H(a2) and H(a3) can be combined together and then hashed to produce H(c1). H(c1) can, in turn, be combined together with H(c2) and H(c3), and the resulting combination hashed to produce H(cc1). This process can continue until a root hash H(Root) of the entire Merkle tree is produced.

In this way, the hashes 'H' of the atomic data chunks are used as a basis to build the Merkle tree, denoted as "composite (metadata)" data in FIG. 1, which ultimately produces the root hash H(Root). More particularly, root hashes at ascending levels identify higher level object such as files (H(a1) for example), directories (H(c1) for example), volumes (H(cc1) for example), and backups (H(Root)). The root hashes for backups, 'H(Root),' are referenced within the backup records that are part of the overall backup catalog of a company. In the example of FIG. 1, H(Root) is the hash of the entire Merkle tree. It is also noted that a hash may be a "hash of hashes" that makes up part of a file. For example, large files may have 2 or more levels of content hashes. In any case, any content hashes may be stored on the HSAN but any metadata that identifies higher level objects, such as files and directories for example) will not be stored on the HSAN.

Any portion, or sub-tree, of the Merkle tree up to, and including, the entire tree, can be compared with the corresponding portion of another Merkle tree and if the two portions each have the same root hash, it can be concluded that everything included in one of the portions is the same as what is included in the other portion. For example, if a directory level tree of node 300a has the same root hash as a directory level tree of node 300b, then the content of the respective directory level trees must be the same.

The composite data and backup catalog remain private to a given entity, and composite data is not deduplicated across the private data lakes represented by nodes 300a and 300b. Thus, no HSAN user can reconstruct the files, directories, or backups of another HSAN user unless they also happen to have the same files, directories, or backups. At most, one user can know that another user has the same data, but this is expected to mainly be true for common data shared by users, such as OS files like Linux or Windows for example, or application software files, such as Oracle binaries for example.

C. Distributed Ledger

Figure 2:
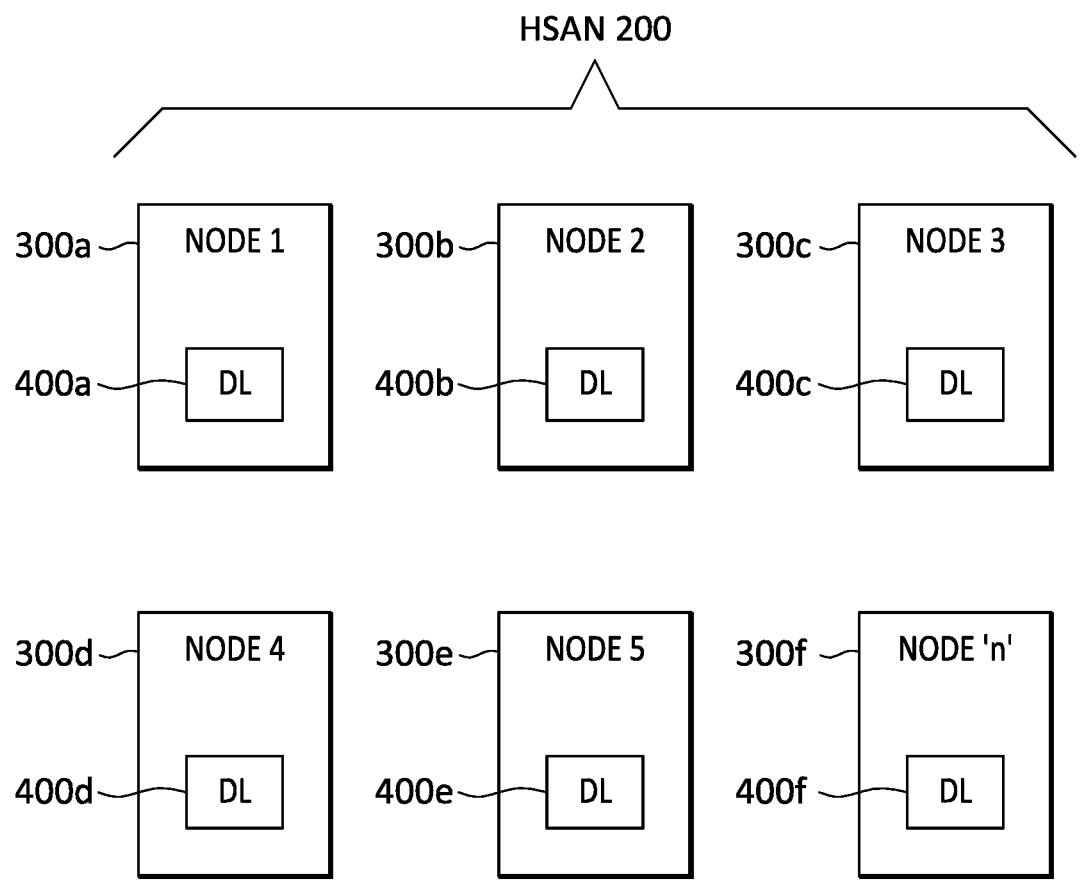
FIG. 2 discloses further aspects of an example HSAN.

With continued reference to FIG. 1, and directing attention now to FIG. 2 as well, a public distributed ledger, referred to generically at 400, but comprising example instances 400a-f, which may be similar to the ledger used in the Bitcoin or Ethereum blockchains, is used to share information between nodes 300a-e about where copies of atomic chunks are stored. A distributed ledger refers to the notion that each node 300a, 300b, 300c, 300d, 300e, and 300f, has a copy of the ledger, as shown in the example of FIG. 2.

In general, the ledger 400 serves as a public record of references to data segments that are stored at the various nodes 300a-e, one or more of which nodes may comprise, or consist of, a private data lake. The references in the ledger 400 contain the content fingerprint, or hash, and storage locations, in the respective data lakes, of the data segments. However, the references in the ledger 400 do not contain metadata about the private files and directories to which the data segments belong, nor do the references contain any actual data segments. Thus, the private data stored at the various nodes is not accessible by way of the ledger 400. That is, only the hash is added and will be visible to others in the ledger. Moreover, the hash cannot be reversed so while the record that includes the hash is public, the underlying data of the hash is not public nor accessible to any but the caller.

In more detail, each entry, or reference, in the ledger 400 contains the following information: user ID, such as the public key of a node for example; the hash of the atomic, that is, the hash of the data segment; and, transaction information concerning that data segment, examples of which transactions are addressed below. Ledger entries are stored in blocks containing a fixed maximum number of entries, along with a header. The content of each block is hashed, and that hash is referenced in the header of the next block in a linked list of blocks, thus forming an immutable blockchain. Thus, the ledger 400 includes all the information necessary to construct the Merkle tree for each node 300a-e in the HSAN although, as noted herein, while the information in the ledger is public, the data segments referred to by the ledger entries are private and accessible only by the owner of the data. In this way, the public data that is shared by the nodes can be deduplicated without risk of public access to private data.

As suggested in FIG. 2, each node 300a-f stores a copy of the entire blockchain. The blockchain is a permissioned blockchain, rather than a trustless blockchain like Bitcoin. As used herein, a permissioned blockchain refers to the notion that there is a level of implied trust between/among the nodes 300a-f. Thus, for example, entities that own the existing nodes in the system must mutually agree with each other, such as by way of a legal or other agreement for example, to allow a new entity to add one or more nodes into the system.

D. Some Example HSAN Transactions

With continued reference to FIGS. 1 and 2, details are now provided concerning some example HSAN transactions, or operations. In general, any participant in the HSAN can replay its transactions listed in the ledger and verify that the ledger records are correct. If a transaction is not correct for some reason, the participant to whom the transaction belongs can submit a request to the other members to make the necessary corrections.

Example embodiments of the invention embrace the following set of HSAN operations, although other, and additional, operations may be employed as well: IS_PRESENT; ADD_DATA; REF_DATA; GET_DATA; DEREF_DATA; DEL_DATA; CHECK_DATA; and, REPL_DATA. Following is a discussion of each of these example operations in turn.

The IS_PRESENT operation queries the ledger 400 for entries containing a fingerprint that corresponds to particular data. If an entry is not present, or if an insufficient number of entries are not present to meet the desired replication factor, then an entry can be added using the ADD_DATA operation, as discussed below. On the other hand, if there are a sufficient number of entries for a data segment in the ledger, then there is no need to add the entry. In any case, the replication factor is set at a graph-level, during initialization time, to minimize complexity. In other embodiments, the replication factor could be set per chunk, or at some other level of granularity.

A brute force implementation of an IS_PRESENT query might require scanning the entire ledger, which would take linear time as the ledger grows in size. However, the query process could be optimized, or at least improved, through the use and maintenance of a searchable index of ledger entries. IS_PRESENT queries to that index could be further optimized by using a suitably-sized bloom filter as an initial check to determine the probable presence of a hash within the index. In some embodiments, each node owner separately creates and maintains its own such index. In other embodiments, a group of trusted owners may cooperate with each other to create and maintain such an index, to which all in the group could direct IS_PRESENT queries.

Another operation implemented by embodiments of the invention is ADD_DATA. In general, the ADD_DATA operation adds an entry to the ledger to specify that the caller is storing one copy of the chunk. If it is the first copy of the chunk, then the caller is implicitly trusted. The number of instances of a chunk referenced in the ledger can be dictated by a replication factor. In this way, unneeded duplication of data segments across the customer data lakes is avoided, since only a certain number of copies of any data segment will be permitted an entry in the ledger. Thus, data deduplication is implemented in various embodiments of the invention by controlling the number of entries for a data segment in the ledger. Note that deduplication, as used herein, does not necessarily require that only a single copy of a data segment be referenced in the ledger. Rather, and more generally, data deduplication embraces the notion that a limit of some kind will be placed on the number of copies of a data segment that can be referenced in the ledger, where that number X is a whole integer that can be any number that is ≥1. As explained below, embodiments of the invention embrace mechanisms for ensuring data availability in the event of a problem. While the replication factor X could be as low as 1, for maximum deduplication, the value of the replication factor, in practice, may typically be ≥2 so as to add resiliency to node or hardware failures. Thus, use of the replication factor may be optional in some embodiments, since a replication value of 1 corresponds to no replication.

In particular, embodiments of the HSAN employ a basic replication factor to store X copies of a chunk, so that users can be reassured that if a disk, system, or even a whole company that is contributing systems and data to the HSAN, were to be removed or otherwise become unavailable for any reason, the stored chunks of data can still be accessed. That is, because the replication factor X (where X is at least 2) provides that X copies of a chunk are stored, even if one or more chunks become lost, compromised, or inaccessible, X−1 copies of that chunk are still available and can be accessed by the members of the HSAN.

As noted above, when a first copy of a chunk is stored, the caller is implicitly trusted. However, if there is an ADD_DATA call to store a subsequent copy of that chunk, embodiments of the invention provide for a challenge/response mechanism to prevent spoofing. In one example of a challenge/response process, the caller of the ADD_DATA operation sends a request to one or more nodes 300a-e that already have entries for the hash identified in the request. Those other nodes respond to the ADD_DATA by sending back to the caller a unique piece of information with which to transform the data identified in the ADD_DATA call. This unique piece of information may comprise, for example, a salt value with which to re-hash the data, or a key with which to re-encrypt and re-hash the data. Using the salt, key, or other unique information provided by the other node(s), the caller then replies to the other nodes with the requested transformation of the data. The other nodes then communicate among themselves, and if they all agree that the caller supplied the correct response, an entry corresponding to the ADD_DATA call is added to the ledger.

In this way, the challenge/response mechanism prevents a caller from falsely claiming to have the data for a hash, and then later requesting to retrieve the corresponding chunk, potentially leaking information from nodes that truly possess the chunk. That is, the caller is required to prove that it has the data before it will be permitted to add an entry to the ledger for that data.

In any case where the nodes cannot agree about the data corresponding to the hash, the ADD_DATA operation fails with an error, and the state of the HSAN is deemed to be indeterminate. Further analysis can be coordinated between the companies involved to determine the nature of the error. As well, a cryptographic hash function with sufficient strength to prevent collisions for a given chunk size must be chosen when the HSAN is initialized.

The foregoing discussion concerns processes that can be performed when an ADD_DATA call is made by an owner with respect to private data of that owner. Embodiments of the invention also provide for the addition of public information references to the ledger. For example, if a node attempts to add public information, such as a social media image, that is already referenced in the ledger by way of a fingerprint, the submitter will be notified that the file has already been stored and a second copy is not necessary. In this case, the submitter may simply note that it has a reference to the data and can use that reference to access the data, when needed, from the node that has that data. For a first-time submission of public data, the entry stored in the ledger may simply point to the submitter as holding a publicly accessible copy of that public data.

With continued reference now to some other example HSAN transactions, the REF_DATA transaction can use the same challenge/response mechanism employed in ADD_DATA transactions to record that a user has a reference to the chunk, if there are already sufficient copies of the data recorded on the graph. Adding such an entry to the ledger guarantees that the user will later be able to recover the chunk if their local copy has been deleted, corrupted, lost, or compromised.

As well, any nodes that have previously called ADD_DATA or REF_DATA can use GET_DATA to request that another node that holds the data provide the chunk corresponding to the supplied fingerprint. Before providing the chunk however, the node from which the data has been requested must verify that the ledger contains the appropriate entry for the requesting node. The DEREF_DATA transaction records that a node no longer has any references to a chunk.

With reference now to the DEL_DATA transaction, that HSAN transaction works together with DEREF_DATA to remove entries from the ledger of the HSAN. A node that is storing a copy of a chunk can scan through the ledger to see if all uses of REF_DATA for the chunk have a corresponding DEREF_DATA. This action may be triggered when the node copy of the chunk is no longer referenced by a backup in the backup catalog of the company, as determined by a maintenance operation such as, for example, Garbage Collection on Avamar or DataDomain.

If the aforementioned scan finds that no external references to the chunk exist, then the node that performed the scan can issue a DEL_DATA request for that chunk to the other nodes holding copies of the data. If all nodes agree that there are no longer any references to the chunk, all the nodes record DEL_DATA entries on the ledger and delete their respective copies of the chunk. In this way, a garbage collection function is performed for the HSAN. Note that even after the chunk copies have been deleted, there is always a permanent record on the ledger that the data was added, referenced, de-referenced, and then deleted.

If an ADD_DATA or REF_DATA request arrives to any node before the DEL_DATA entry is committed, then the deletion operation is aborted by that node, which in turn aborts the entire operation across the HSAN. As well, if the request to add or reference data comes after the DEL_DATA entry is committed, then the data must be re-added using the ADD_DATA processes noted earlier.

The CHECK_DATA HSAN transaction is a variation of IS_PRESENT that can be issued to any node that has a copy of the chunk corresponding to a specified hash. Callers may issue this request as part of their data protection storage system validation processes, such as the Avamar 'hfscheck' process for example. A node that receives a CHECK_DATA request re-reads and re-hashes its copy of the chunk to verify that the data is present and intact at that node. The result of the operation performed by the node in response to the CHECK_DATA request may be cached for a fixed period of time, such as 1 day or 1 week for example, to avoid having to re-verify data too often. It is up to callers of CHECK_DATA to decide what number of copies of a data chunk is sufficient to satisfy the validation process performed in response to the CHECK_DATA request.

If the CHECK_DATA request reveals that one or more copies of a chunk are unavailable for any reason, the node that initiated the CHECK_DATA request performs a GET_DATA request to store a local copy of the data chunk and ensure that the replication factor is met. Future DEL_DATA requests can clean up excess data chunk copies that may have been created as a result of transient issues, such as nodes being temporarily offline when CHECK_DATA requests are issued.

E. Example Host and Server Configurations

Figure 3:
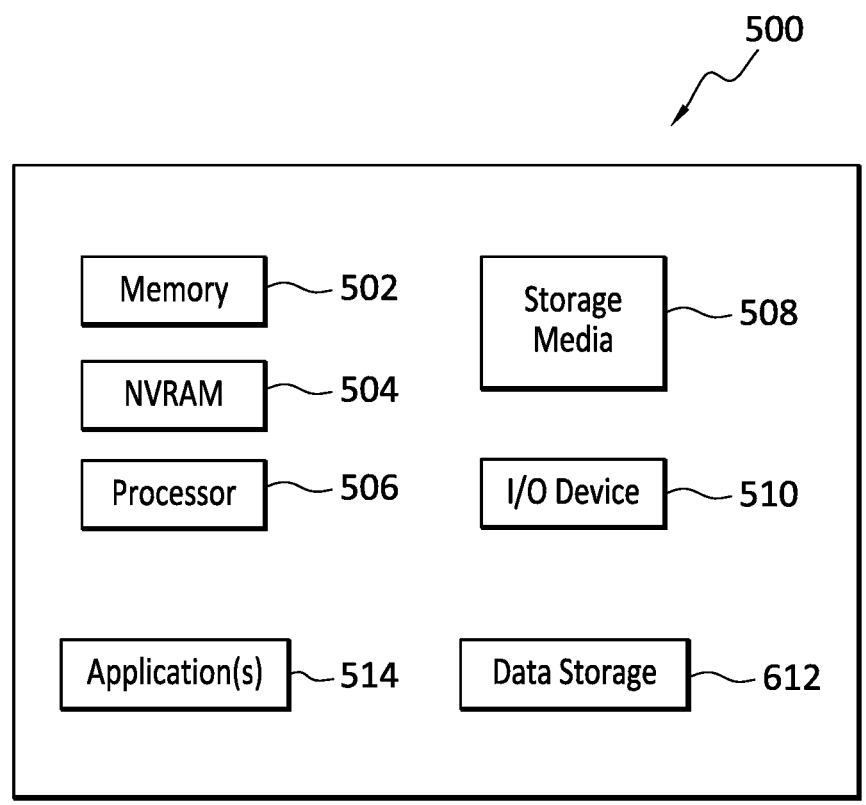
FIG. 3 discloses aspects of an example host configuration.

With reference briefly now to FIG. 3, any one or more of the operating environment 100, HSAN 200, nodes 300a-e, and ledger instances 400a-2, can take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 3.

In the example of FIG. 3, the physical computing device 500 includes a memory 502 which can include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 can take the form of solid state device (SSD) storage. As well, one or more applications 514 are provided that comprise executable instructions. Such executable instructions can take various forms including, for example, instructions executable to perform any function, method, or portion thereof, disclosed herein, and/or executable by/at any of a storage site, whether on-premises at an enterprise, or a cloud storage site, client, datacenter, backup server, blockchain network, or blockchain network node, to perform functions disclosed herein. As well, such instructions may be executable to perform any of the other operations disclosed herein including, but not limited to, blockchain ledger operations, ledger entry submissions, and, HSAN transactions.

F. Example Methods

Figure 4:
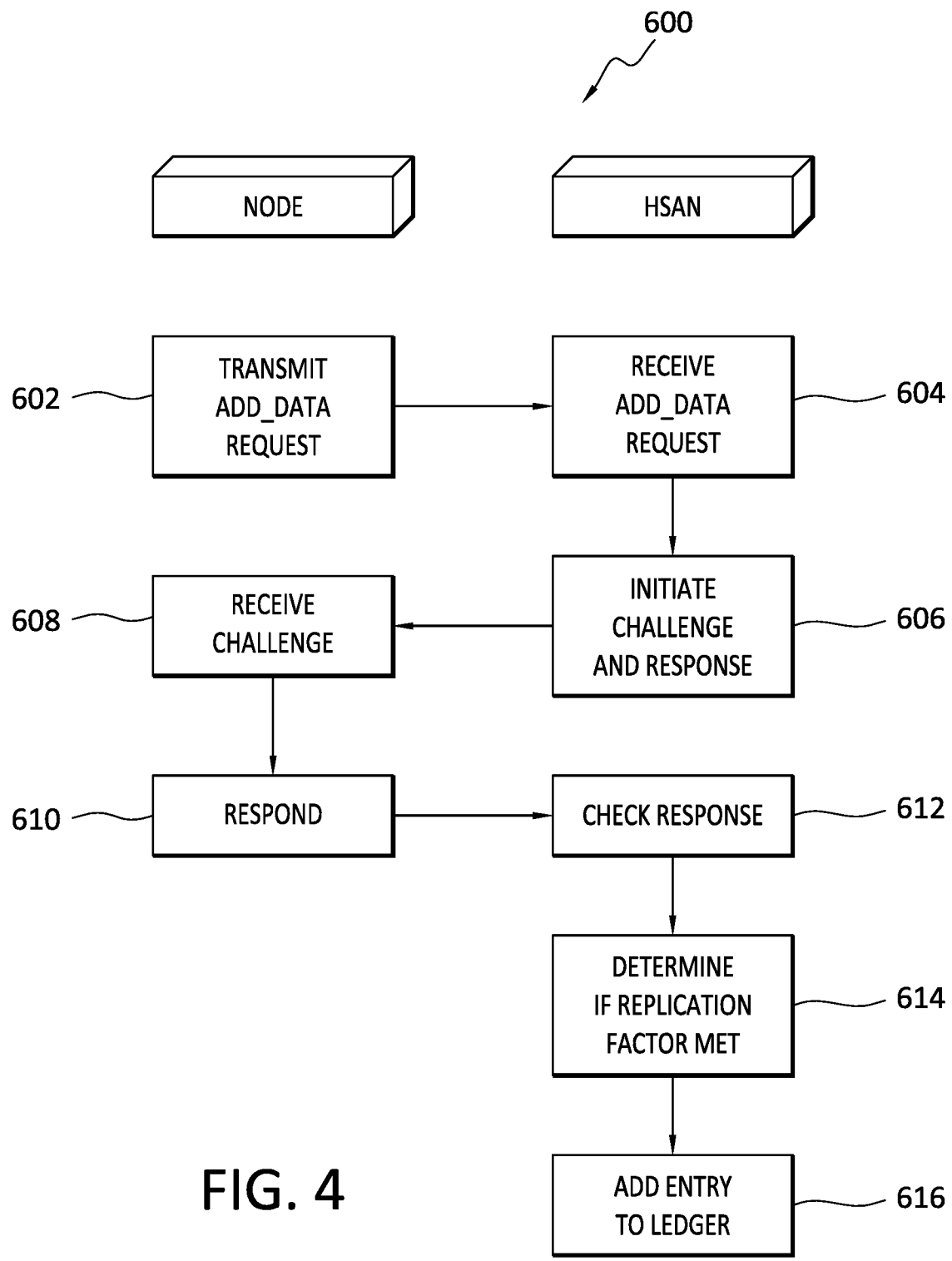
FIG. 4 is a flow diagram that discloses some general aspects of an example method deduplication process performed in an HSAN.

With attention now to FIG. 4, aspects of example methods are disclosed. One particular method is denoted generally at 600 and concerns data deduplication in an HSAN environment. The example method 600 may be cooperatively performed by multiple entities, such as a node, HSAN, and distributed ledger for example. However, the functional allocation indicated in FIG. 4 is provided only by way of example, and in other embodiments, the disclosed functions may be allocated differently amongst the various entities. It should also be noted, that as with the other methods and processes disclosed herein, the order of the various processes in the method 600 may be different than the order indicated, and the disclosed processes are not required to be performed in the order indicated in the Figures.

The example method 600 may begin when a node, which may be referred to as the caller, transmits an ADD_DATA request 602 to an HSAN, requesting that an entry be added to a public distributed ledger of the HSAN. In some embodiments at least, the caller is one of a group of nodes that are included in the HSAN and, correspondingly, the transmitting node may include a copy of the distributed ledger. The request transmitted 602 by the caller may comprise a user ID that identifies the node, a hash of a data segment, and a storage location of the data segment at the node. Notably, while the request 602 includes a hash of a data segment, the data segment itself is not included in the request, and the hash cannot be calculated in reverse except by the caller that made the ADD_DATA request.

At 604, the request is received and evaluated by the other nodes of the HSAN. Any, all, or a designated one, of the other nodes may initiate 606 a challenge-and-response process with the caller that transmitted 602 the request. The challenge-and-response process can help to prevent spoofing by ensuring that the caller actually has a copy of the data segment that it purports to have. This is because the ADD_DATA request, alone, does not provide such assurance. As part of the challenge-and-response 606 process, the caller receives 608 a challenge from the other node(s) of the HSAN. The challenge can comprise a unique piece of information with which to transform the data identified in the ADD_DATA call. Using a salt, key, or other unique information provided by the other node(s), the caller responds 610 to the other nodes with the requested transformation of the data. The other nodes then communicate among themselves 612, and if they all agree that the caller supplied the correct response, an entry corresponding to the ADD_DATA call is added 616 to the ledger.

As also noted in FIG. 4, the evaluation of the response 610 by the other node(s) of the HSAN can include determining whether a replication factor is met 614. The process 614 can include comparing how many copies of the data segment identified at 602 already exist in storage at the time of the request 602. If the replication factor is X, and X−1 copies of the data segment exist at the time of the request 602, then the entry requested by the caller will be added 616 to the ledger, so long as the other conditions for doing so have been met.

On the other hand, if the replication factor is X, and X copies of the of the data segment exist at the time of the request 602, then the entry requested by the caller will not be added to the ledger. In this case, the caller may be notified that the replication factor has already been met and no new entry to the ledger will be made. In this way, data deduplication is performed by limiting the number of copies of a data segment that are permitted to exist in the HSAN.

It is noted that even in the case where the replication factor has been met, the challenge-and-response process can still be performed, since the caller may wish to access the stored data segment at some point in the future, and would thus have to demonstrate to the HSAN that it possessed a copy of that data segment. Thus, if a node does not need to ADD_DATA, then a REF_DATA can be added to the ledger instead to allow the caller future access to the data. Thus, some embodiments of the invention may simply omit the process 616, but retain the other processes shown in FIG. 4.

As will be apparent from the foregoing discussion, the process 614 can be performed at any time after receipt 604 of the ADD_DATA request. Thus, the particular processes, and their order, disclosed in FIG. 4 are presented only by way of example, and are not intended to be limiting of the scope of the invention.

G. Further Example Embodiments

Following are some further example embodiments of the invention. These are presented only by way of example and are not intended to limit the scope of the invention in any way.

Embodiment 1. A method, comprising: receiving from a node, in an HSAN that includes multiple nodes, an ADD_DATA request to add an entry to a distributed ledger of the HSAN, the request comprising a user ID that identifies the node, a hash of a data segment, and a storage location of the data segment at the node; performing a challenge-and-response process with the node to verify that the node has a copy of the data that was the subject of the entry; making a determination that a replication factor X has not been met; and adding the entry to the distributed ledger upon successful conclusion of the challenge-and-response process.

Embodiment 2. The method as recited in embodiment 1, further comprising splitting backup data into a plurality of data segments that includes the data segment, and hashing the data segment.

Embodiment 3. The method as recited in embodiment 1, wherein the distributed ledger does not permit an HSAN node access to the data segment upon which the entry is based unless that HSAN node has demonstrated possession of a copy of that data segment.

Embodiment 4. The method as recited in embodiment 1, wherein the distributed ledger is a public distributed ledger that permits any HSAN node to access the entry.

Embodiment 5. The method as recited in embodiment 1, wherein the distributed ledger is a public distributed ledger that includes one or more entries that point to public data accessible by all nodes of the HSAN.

Embodiment 6. The method as recited in embodiment 1, further comprising adding a node to the HSAN upon mutual agreement of other nodes of the HSAN.

Embodiment 7. The method as recited in embodiment 1, wherein metadata concerning the data segment identified in the request is omitted from the request.

Embodiment 8. The method as recited in embodiment 1, wherein use of the replication factor X ensures that no more than X copies of a data segment will be stored in the HSAN.

Embodiment 9. The method as recited in embodiment 1, wherein entries are stored in the distributed ledger as a blockchain.

Embodiment 10. The method as recited in embodiment 1, further comprising performing any one or more of the HSAN operations: IS_PRESENT; REF_DATA; GET_DATA; DEREF_DATA; DEL_DATA; CHECK_DATA; and/or REPL_DATA.

Embodiment 11. A method for performing any of the processes, or any portion thereof, disclosed herein.

Embodiment 12. A non-transitory storage medium having stored therein instructions that are executable by one or more hardware processors to perform the operations of any one or more of embodiments 1 through 11.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    transmitting, by a caller, to a hyper-scale, peer-to-peer, de-duplicated storage system (HSAN) that includes multiple nodes, an ADD_DATA request to add an entry to a distributed ledger of the HSAN, the request comprising a user ID that identifies the caller, a hash of a data segment, and a storage location of the data segment at the caller;
    performing, by the caller together with one or more of the nodes of the HSAN, a challenge-and-response process to verify that the caller has a copy of the data segment that was the subject of the entry;
    receiving, by the caller, a unique piece of information including a salt;
    re-encrypting and re-hashing, by the caller, the data segment with the salt to transform the data segment; and
    providing, by the caller, the transformed data segment to the HSAN,
    wherein successful conclusion of the challenge-and-response process enables the entry to be added to the distributed ledger of the HSAN so long as a replication factor X has not been met, and
    wherein the replication factor X specifies a maximum number X of copies of the data segment that will be stored in the HSAN.

2. The method as recited in claim 1, wherein the challenge-and-response process comprises receiving, by the caller, a challenge from the one or more nodes of the HSAN.

3. The method as recited in claim 2, wherein the challenge comprises a unique piece of information usable by the caller to transform data identified in the ADD_DATA request.

4. The method as recited in claim 1, wherein the caller is a node of the HSAN.

5. The method as recited in claim 1, wherein an unsuccessful conclusion of the challenge-and-response process prevents the entry from being added to the distributed ledger of the HSAN.

6. The method as recited in claim 1, wherein the transmitting comprises transmitting, by the caller, the ADD_DATA request to the multiple nodes of the HSAN.

7. The method as recited in claim 1, wherein successful conclusion of the challenge-and-response process indicates that the nodes of the HSAN have agreed amongst themselves that the caller supplied the correct response in the challenge-and-response process.

8. The method as recited in claim 1, wherein when conclusion of the challenge-and-response process is unsuccessful, the caller receives a notification that the replication factor X has already been met and no new entry to the ledger will be made.

9. The method as recited in claim 1, wherein distributed ledger of the HSAN comprises a public distributed ledger.

10. The method as recited in claim 1, wherein the caller comprises a copy of the distributed ledger of the HSAN.

11. A non-transitory storage medium having stored therein instructions that are executable by one or more hardware processors to perform operations comprising:
    transmitting, by a caller, to a hyper-scale, peer-to-peer, de-duplicated storage system (HSAN) that includes multiple nodes, an ADD_DATA request to add an entry to a distributed ledger of the HSAN, the request comprising a user ID that identifies the caller, a hash of a data segment, and a storage location of the data segment at the caller;
    performing, by the caller together with one or more of the nodes of the HSAN, a challenge-and-response process to verify that the caller has a copy of the data segment that was the subject of the entry;
    receiving, by the caller, a unique piece of information including a salt;
    re-encrypting and re-hashing, by the caller, the data segment with the salt to transform the data segment; and
    providing, by the caller, the transformed data segment to the HSAN,
    wherein successful conclusion of the challenge-and-response process enables the entry to be added to the distributed ledger of the HSAN so long as a replication factor X has not been met, wherein the replication factor X specifies a maximum number X of copies of the data segment that will be stored in the HSAN.

12. The non-transitory storage medium as recited in claim 11, wherein the challenge-and-response process comprises receiving, by the caller, a challenge from the one or more nodes of the HSAN.

13. The non-transitory storage medium as recited in claim 12, wherein the challenge comprises a unique piece of information usable by the caller to transform data identified in the ADD_DATA request.

14. The non-transitory storage medium as recited in claim 11, wherein the caller is a node of the HSAN.

15. The non-transitory storage medium as recited in claim 11, wherein an unsuccessful conclusion of the challenge-and-response process prevents the entry from being added to the distributed ledger of the HSAN.

16. The non-transitory storage medium as recited in claim 11, wherein the transmitting comprises transmitting, by the caller, the ADD_DATA request to the multiple nodes of the HSAN.

17. The non-transitory storage medium as recited in claim 11, wherein successful conclusion of the challenge-and-response process indicates that the nodes of the HSAN have agreed amongst themselves that the caller supplied the correct response in the challenge-and-response process.

18. The non-transitory storage medium as recited in claim 11, wherein when conclusion of the challenge-and-response process is unsuccessful, the caller receives a notification that the replication factor X has already been met and no new entry to the ledger will be made.

19. The non-transitory storage medium as recited in claim 11, wherein distributed ledger of the HSAN comprises a public distributed ledger.

20. The non-transitory storage medium as recited in claim 11, wherein the caller comprises a copy of the distributed ledger of the HSAN.

* * * * *